(12) United States Patent
Nagasawa

(10) Patent No.: US 7,929,166 B2
(45) Date of Patent: Apr. 19, 2011

(54) DATA MANAGING DEVICE, DATA MANAGING PROGRAM EMBODIED ON A COMPUTER READABLE MEDIUM AND DATA MANAGING METHOD FOR MANAGING DATA STORED IN APPARATUS TO BE CONTROLLED

(75) Inventor: Kenichi Nagasawa, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1173 days.

(21) Appl. No.: 11/607,071

(22) Filed: Dec. 1, 2006

(65) Prior Publication Data

US 2008/0030817 A1 Feb. 7, 2008

(30) Foreign Application Priority Data

Jul. 18, 2006 (JP) ................. 2006-195740

(51) Int. Cl.
G06F 3/12 (2006.01)
G06F 15/00 (2006.01)
H04N 1/40 (2006.01)
H04N 1/46 (2006.01)

(52) U.S. Cl. ............ 358/1.15; 358/1.13; 358/1.16; 358/401

(58) Field of Classification Search .......... 358/1.15, 358/1.13, 1.16, 1.9, 426.05, 401; 710/8
See application file for complete search history.

(56) References Cited

U.S. PATENT DOCUMENTS
6,728,633 B2  4/2004  Mikuriya

FOREIGN PATENT DOCUMENTS
| JP | 6-35513 | 2/1994 |
| JP | 7-105062 | 4/1995 |
| JP | 2002-207423 | 7/2002 |
| JP | 2002-297407 | 10/2002 |

OTHER PUBLICATIONS

Japanese Office Action directed at counterpart application JP195740/2006 mailed on Jun. 10, 2008; 4 pages.

Primary Examiner — Thomas J Lett
(74) Attorney, Agent, or Firm — Morrison & Foerster LLP

(57) ABSTRACT

A PC includes: a data acquiring portion to acquire from an MFP connected to a network at least part of the data stored therein as editing data; a data editing portion to edit the editing data; a detecting portion to detect edited part different between a pre-editing version of the editing data and an edited version of the editing data; a selecting portion to select either a rewrite-all mode or an individual rewrite mode, based on the number of records included in the edited part; if the rewrite-all mode is selected, a batch rewriting portion to send a rewrite-all command to the MFP to rewrite the pre-editing version of the editing data with the edited version thereof, and if the individual rewrite mode is selected, an individual rewriting portion to send at least one individual rewrite command to the MFP to rewrite all records of the edited part one by one.

21 Claims, 8 Drawing Sheets

FIG. 5

|  | TYPE A MFP | TYPE B MFP |
|---|---|---|
| UNIT TIME TO MODIFY | 0.5 SECONDS | 0.4 SECONDS |
| UNIT TIME TO ADD | 0.5 SECONDS | 0.2 SECONDS |
| UNIT TIME TO DELETE | 0.2 SECONDS | 0.4 SECONDS |
| BATCH REWRITING TIME | 60 SECONDS | 50 SECONDS |

FIG. 6

|  | STAND-BY | PRINTING | SLEEP |
|---|---|---|---|
| UNIT TIME TO MODIFY | 0.5 SECONDS | 1.0 SECONDS | 2.0 SECONDS |
| UNIT TIME TO ADD | 0.5 SECONDS | 1.0 SECONDS | 2.0 SECONDS |
| UNIT TIME TO DELETE | 0.2 SECONDS | 0.5 SECONDS | 1.5 SECONDS |
| BATCH REWRITING TIME | 60 SECONDS | 120 SECONDS | 200 SECONDS |

DATA MANAGING DEVICE, DATA MANAGING PROGRAM EMBODIED ON A COMPUTER READABLE MEDIUM AND DATA MANAGING METHOD FOR MANAGING DATA STORED IN APPARATUS TO BE CONTROLLED

This application is based on Japanese Patent Application No. 2006-195740 filed with Japan Patent Office on Jul. 18, 2006, the entire content of which is hereby incorporated by reference

BACKGROUND OF THE INVENTION

1. Field of the Invention

The present invention relates generally to a data managing device, data managing program embodied on a computer readable medium and data managing method, and more particularly to a data managing device, data managing program embodied on a computer readable medium and data managing method for managing data stored in a particular device to be controlled.

2. Description of the Related Art

Remote control of composite machines (referred to as MFPs (Multi Function Peripherals) hereinafter), which combine printing, scanning, and facsimile functions, is now possible as these machine connected to computers. MFPs are capable of storing various types of data, such as user data for managing users to restrict users who operate the MFP, destination data listing destinations of facsimile and e-mails, and the like. Users may enter/edit such data using the control panel of the MFP. In addition, users can import the data stored in the MFP to a computer, edit it, and then rewrites the data in the MFP with the edited data by remotely controlling the MFP from the computer.

Briefly, there are two methods for editing data stored in the MFP using computers. In a first method, the computer combines modified and unmodified data and sends it as a bundle of data to the MFP which, in turn, rewrites the existing data that is already stored therein with the received bundle of data. The sending/receiving procedure may only be executed once at the sending side and the receiving side, respectively, in the first method, because the data is sent/received in a bundle. In this case, the MFP executes the same procedure regardless of whether the amount of data to be sent is changed, and no significant difference has been found in time for the MFP to process two bundles of data having different data amount. A suitable communication protocol for the first method is an FTP (File Transfer Protocol), for example.

In a second method, the computer sends a command to modify each record of the edited part of the data that is changed from the pre-editing version of the data, and the MFP updates the existing data stored therein each record after another in response to the received command. Thus, the MFP only rewrites the records of the edited part of the data, which differs from the pre-editing version of the data, in the second method, so that the rewriting time of each rewriting job is shorter than that of the first method. However, if the number of records of the changed part is increased, the accompanying rewriting time will be longer and the total time to rewrite all records of the changed part may be longer than the first method. A SORP (Simple Object Access Protocol), for example, is a suitable communication protocol for the second method.

In editing the data stored in the MFP, the user must choose a program to update the data in accordance with either the first or second method and order the computer to execute the program. It has been difficult, however, for the user to determine prior to editing which program might deserve choosing.

It is noted that Japanese Patent Laid-Open Publication No. H6-35513 discloses the technique to divide data before sending it when a large amount of data should be sent, while sending all data when a small amount of data should be sent.

SUMMARY OF THE INVENTION

The present invention has been made to solve the problem set forth above, and one object of the present invention is to provide a data managing device capable of rewriting data stored in a particular device to be controlled in a short time.

Another object of the present invention is to provide a data managing program embodied on a computer readable medium, capable of rewriting data stored in a particular device to be controlled in a short time.

A still another object of the present invention is to provide a data managing method capable of rewriting data stored in a particular device to be controlled in a short time.

To achieve the above objects, according to one aspect of the present invention, a data managing device includes: a data acquiring portion to acquire from an image processing apparatus at least part of data stored therein as editing data; a data editing portion to edit the acquired editing data; a detecting portion to detect an edited part which is different between a pre-editing version of the editing data and an edited version of the editing data; a selecting portion to select either a rewrite-all mode or an individual rewrite mode based on the number of records included in the detected edited part; if the rewrite-all mode is selected, a batch rewriting portion to send a rewrite-all command to the image processing apparatus to order the image processing apparatus to rewrite the pre-editing version of the editing data with the edited version of the editing data; and if the individual rewrite mode is selected, an individual rewriting portion to send at least one individual rewrite command to the image processing apparatus to order the image processing apparatus to rewrite all records included in the edited part one by one.

In this aspect, when the image processing apparatus rewrites the editing data in response to the rewrite-all command, the rewriting time to rewrite the data is substantially the same regardless of the data amount of the editing data. On the other hand, when the image processing apparatus rewrites the editing data in response to the individual rewrite command, it rewrites the records of the edited part of the editing data, which is changed from the pre-editing version of the editing data, one record after another, so that the rewriting time will be longer as more records are included in the edited part. Since the rewrite mode is chosen between the rewrite-all mode and the individual rewrite mode based on the number of records of the edited part of the data, a data managing device capable of rewriting the data stored in the image processing apparatus in a short time can be provided.

According to another aspect of the present invention, a data managing program embodied on a computer readable medium for causing a computer to execute processing. The processing includes the steps of: acquiring from an image processing apparatus at least part of data stored therein as editing data; editing the acquired editing data; detecting an edited part which is different between a pre-editing version of the editing data and an edited version of the editing data; selecting either a rewrite-all mode or an individual rewrite mode based on the number of records included in the detected edited part; if the rewrite-all mode is selected, sending a rewrite-all command to the image processing apparatus to order the image processing apparatus to rewrite pre-editing version of the editing data with the edited version of the editing data; and if the individual rewrite mode is selected, sending at least one individual rewrite command to the image processing apparatus to order the image processing apparatus to individually rewrite all records included in the edited part one by one.

In this aspect, a data managing program embodied on a computer readable medium capable of rewriting the data stored in the image processing apparatus in a short time can be provided.

According to a further aspect of the present invention, a data managing method executed by a computer connected to an image processing apparatus via a network, to manage data stored in the image processing apparatus, includes the steps of: acquiring from the image processing apparatus at least part of the data stored therein as editing data; editing the acquired editing data; detecting an edited part which is different between a pre-editing version of the editing data and an edited version of the editing data; selecting either a rewrite-all mode or an individual rewrite mode based on the number of records included in the detected edited part; when the rewrite-all mode is selected, sending a rewrite-all command to the image processing apparatus, so as to instruct the image processing apparatus to rewrite the pre-editing version of the editing data with the edited version of the editing data; and when the individual rewriting mode is selected, sending at least an individual rewrite command to the image processing apparatus, so as to instruct the image processing apparatus to rewrite all records included in the edited part one by one.

In this aspect, a data managing method capable of rewriting the data stored in the image processing apparatus in a short time can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 illustrates an example of standard data;

FIG. 6 illustrates an example of standard data for respective operation mode corresponding to MFP 200;

DESCRIPTION OF THE PREFERRED EMBODIMENTS

Figure 1:
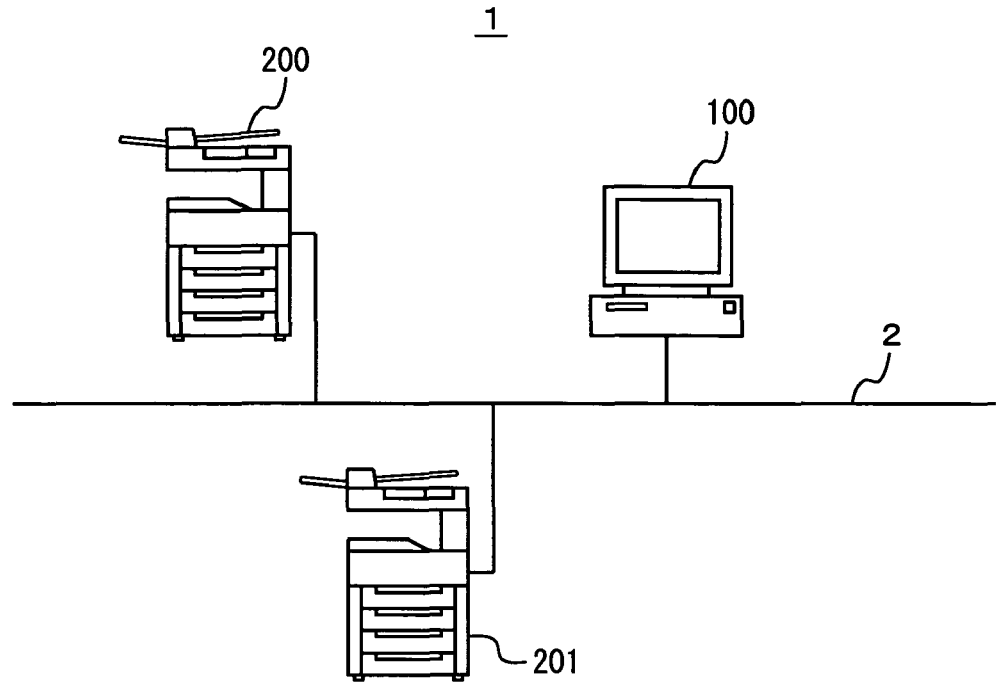
FIG. 1 is an overall schematic view of a printing system according to an embodiment of the present invention.

The present invention will be described below with reference to the accompanying drawings. In the drawings, like numerals indicate similar elements which are designated the same way and perform the same function, and the detailed description thereof will not be repeated.

Referring to FIG. 1, there is shown an overall view of a printing system according to an embodiment of the present invention. As shown in FIG. 1, a printing system 1 includes a personal computer (hereinafter referred to as a "PC") 100 and MFPs (Multi Function Peripherals) 200 and 201, each of which is connected to a network 2.

The network 2 may be implemented as a local area network (LAN) in a wired or wireless configuration. Alternatively, the network 2 may be implemented by other types of network, such as a wide area network (WAN), the Public Switched Telephone Network (PSTN), and the like.

PC 100 is a general computer in which a driver program for controlling MFPs 200 and 201 is installed. If MFPs 200 and 201 are of different type, two kinds of driver programs for controlling MFPs 200 and 201, respectively, are installed in PC 100. PC 100 functions as a data managing device for managing data stored in MFPs 200 and 201.

Figure 2:
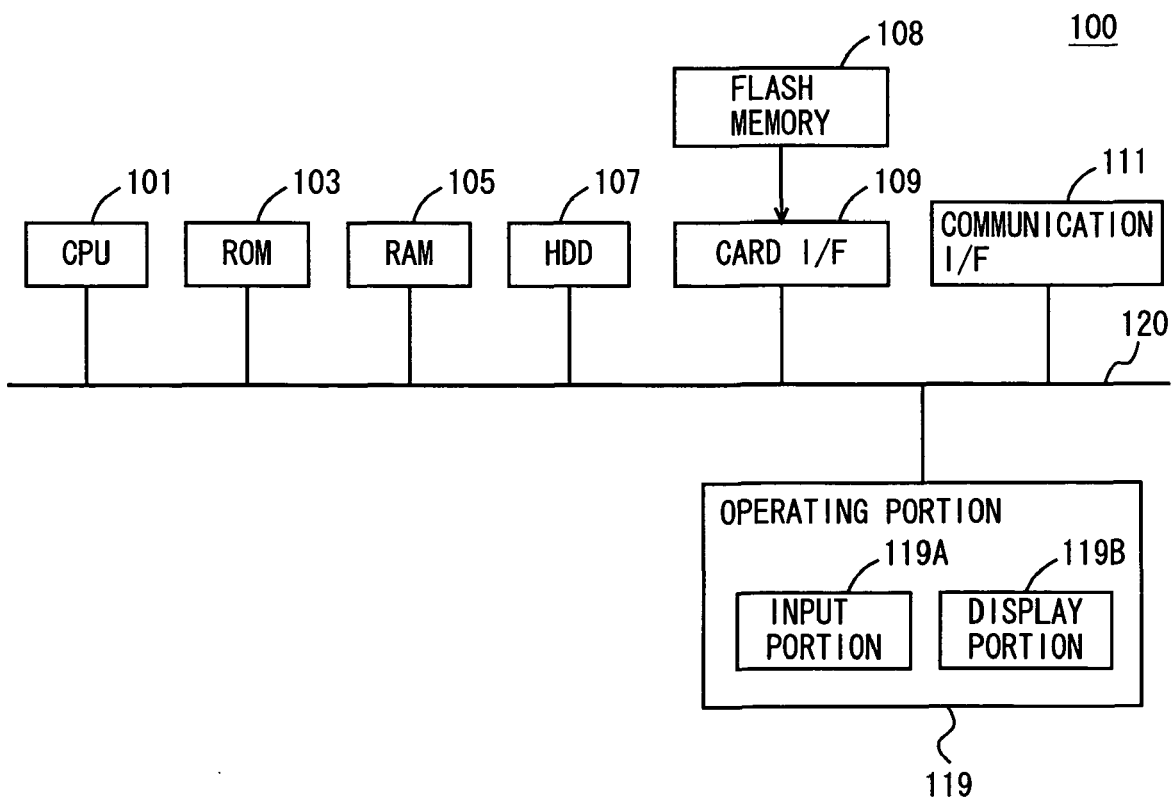
FIG. 2 is a block diagram illustrating an example of a hardware structure of a PC according to the embodiment of the present invention.

FIG. 2 is a block diagram of an exemplary hardware structure of PC 100 according to the embodiment of the present invention. As shown in FIG. 2, PC 100 includes a central processing unit (CPU) 101, a read only memory (ROM) 103 which stores programs or the like to be executed by CPU 101, a random access memory (RAM) 105 which loads a program for execution and stores data while the program is executed, a hard disc drive (HDD) 107 which stores data in a nonvolatile manner, a card interface (I/F) 109 which attached a flash memory 108, a communication I/F 111 which connects CPU 101 to the network 2, and an operating portion 119 which serves as an interface with the user.

CPU 101 loads and executes the printer driver program stored in flash memory 108 that is inserted in the card I/F 109. In addition to the driver program recorded in the flash memory 108, CPU 101 may execute the program stored in HDD 107 by loading it into RAM 105. In this case, another computer connected to the network 2 may rewrite the driver program stored in HDD 107 of PC 100, or additionally writes a new driver program thereto. Further, PC 100 may download a driver program from another computer connected to the network 2 and stores it in HDD 107. The term "program" herein includes not only a program executable directly by CPU 101, but also other programs such as source-type programs, compressed programs and encrypted programs.

Operating portion 119 includes an input portion 119A and a display portion 119B. Input portion 119A is implemented by an input device, such as a keyboard, a mouse, and the like, for receiving inputs manipulated by the user. Display portion 119B is implemented by a display device, such as a liquid crystal display, an organic electroluminescence display (EL) panel, a cathode-ray tube (CRT), and the like. Input portion 119A may include a pointing device, such as a touch panel.

Communication I/F 111 is a communication interface which connects PC 100 with the network 2, to thereby enable PC 100 to establish communication with other MFPs 200 and 201. Instead of the network 2, PC 100 may be connected directly with other MFPs 200 and 201 via a serial or parallel interface. Any suitable interface applicable to the connecting configuration of PC 100 and other MFPs 200 and 201, respectively, may be used as communication I/F 111.

Each MFP 200, 201 functions as a scanner for reading documents, an image forming apparatus for forming an image on a recording medium, such as paper, according to the image data, and a facsimile machine. Thus, each MFP 200, 201 has multiple functions including image reading, copying, and transmitting/receiving facsimile. It is noted that in the present embodiment, MFPs 200 and 201 are described as image processing apparatus, but any device having an image processing function may be used instead of MFPs 200 and 201, such as a scanner, a printer, a copier, facsimile machine, computers, or the like. It is also noted that MFPs 200 and 201 have the same function and only MFP 200 will be illustrated in the description below until otherwise noted.

Figure 3:
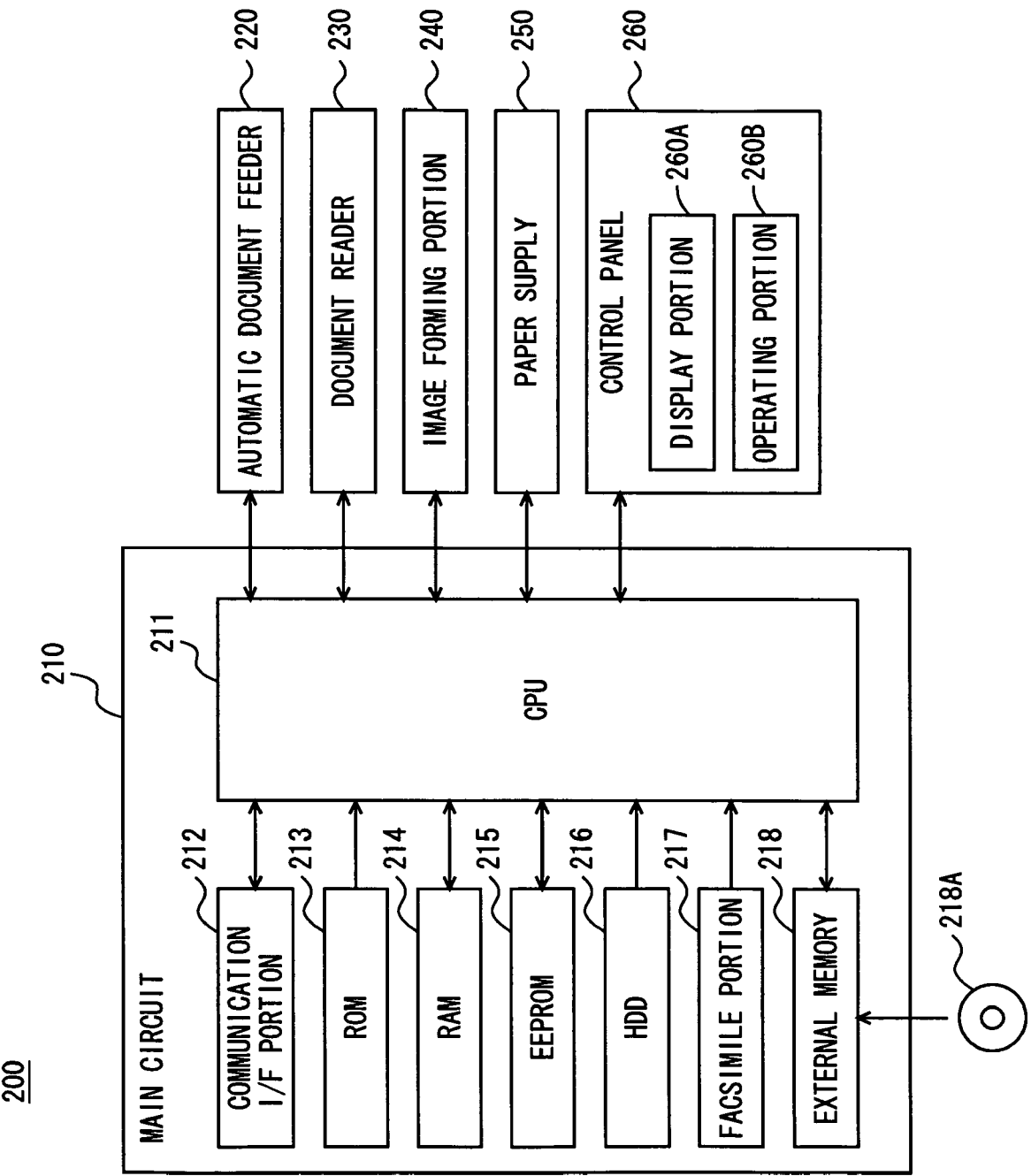
FIG. 3 is a functional block diagram illustrating an overall function of an MFP.

FIG. 3 is a functional block diagram illustrating an overall function of the MFP. As shown in FIG. 3, MFP 200 includes a main circuit 210, a document reader 230 for reading documents, an automatic document feeder 220 for transporting documents to document reader 230, an image forming portion 240 for forming an image on, e.g., a sheet of paper according to the image data supplied from image reader 230 by reading the document, a paper supply 250 for supplying sheets of paper to image forming portion 240, and a control panel 260 which serves as a user interface. Main circuit 210 includes a CPU 211, a communication interface (I/F) 212, a ROM 213, a RAM 214, an electronically erasable and programmable ROM (EEPROM) 215, a hard disc drive (HDD) 216 which is a large capacity memory, a facsimile portion 217, and an external memory 218 to which a compact disc ROM (CD-ROM) 218A is mounted. CPU 211 is connected to automatic document feeder 220, document reader 230, image forming portion 240, paper supply 250, and control panel 260, in order to control the entire MFP 200.

ROM 213 stores a program to be executed by CPU 211, or necessary data for executing the program. RAM 214 is used as a working area when CPU 211 executes the program. In addition, RAM 214 temporarily stores the retrieved data (image data) which is sequentially sent from document reader 230.

Control panel 260 includes a display portion 260A and an operating portion 260B. Display portion 260A is implemented by a display device such as a liquid crystal display (LCD) and an organic electroluminescence display (EL), and displays a menu of instructions or the information of acquired image data toward users. Operating portion 260B includes a plurality of keys for entering data including various instructions, letters and numerals by manipulating individual keys by the user. Operating portion 260B also includes a touch panel provided on display portion 260A.

Communication I/F portion 212 serves as an interface which connects MFP 200 with the network 2. CPU 211 establishes communication with PC 100 via communication I/F portion 212 to transmit/receive data.

HDD 216 stores user management data which is used as an approval list to restrict users who operate the PC, and destination data which is a list of destinations including facsimile destinations and/or e-mail addresses. The user management data includes user identification information, and authentication information, such as passwords. The destination data includes user identification information, fax numbers, and e-mail addresses.

Facsimile portion 217 is connected to PSTN and transmits and/or receives facsimile data to and from PSTN. Facsimile portion 217 stores the received facsimile data in HDD 216, or supplies it to image forming portion 240. In response, image forming portion 240 prints the facsimile data received from facsimile portion 217 on a recording sheet. Alternatively, facsimile portion 217 may convert the data stored in HDD 216 into facsimile data and transmits it to a fax machine connected to PSTN.

CD-ROM 218A is mounted on external memory 218. CPU 211 is accessible to CD-ROM 218A through external memory 218. CPU 211 herein executes the program stored in ROM 213, but the program stored in CD-ROM 218A may be loaded to RAM 214 and executed.

In printing system 1 of the present embodiment, when the driver program is executed by PC 100, it starts controlling MFP 200. PC 100 edits the user management data or the destination data, which both are stored in HDD 216 of MFP 200, and rewrites both data with the edited version of these data. Editing includes modifying, adding, and deleting data.

CPU 211 of MFP 200 executes programs which send/receive data in accordance with FTP, or programs which send/receive data in accordance with SOAP. If the destination data is received from PC 100 in accordance with FTP, CPU 211 stores it in HDD 216. If a command to rewrite one record of the destination data is received from PC 100 in accordance with SOAP, CPU 211 rewrites the one record of the destination data. The rewriting job includes modification, addition, and deletion of the records. MFP 200 may rewrite the destination data, when it received in accordance with FTP, in about 60 seconds, which might not be changed significantly even if the number of records of the destination data is changed. On the other hand, MFP 200 may execute a command received in accordance with SOAP in about 0.2-0.5 seconds, which varies depending on whether the received command is a modify, add, or delete command. Therefore, as the number of commands received in accordance with SOAP is increased, the accompanying rewriting time will be longer. For example, let the command to add a record be executed in 0.5 seconds, executing a received command to add 120 records will take as long as 60 seconds, as flatly calculated.

An exemplary rewriting procedure which is executed by PC 100 and MFP 200 to rewrite the destination data stored in HDD 216 of MFP 200 will be described below.

Figure 4:
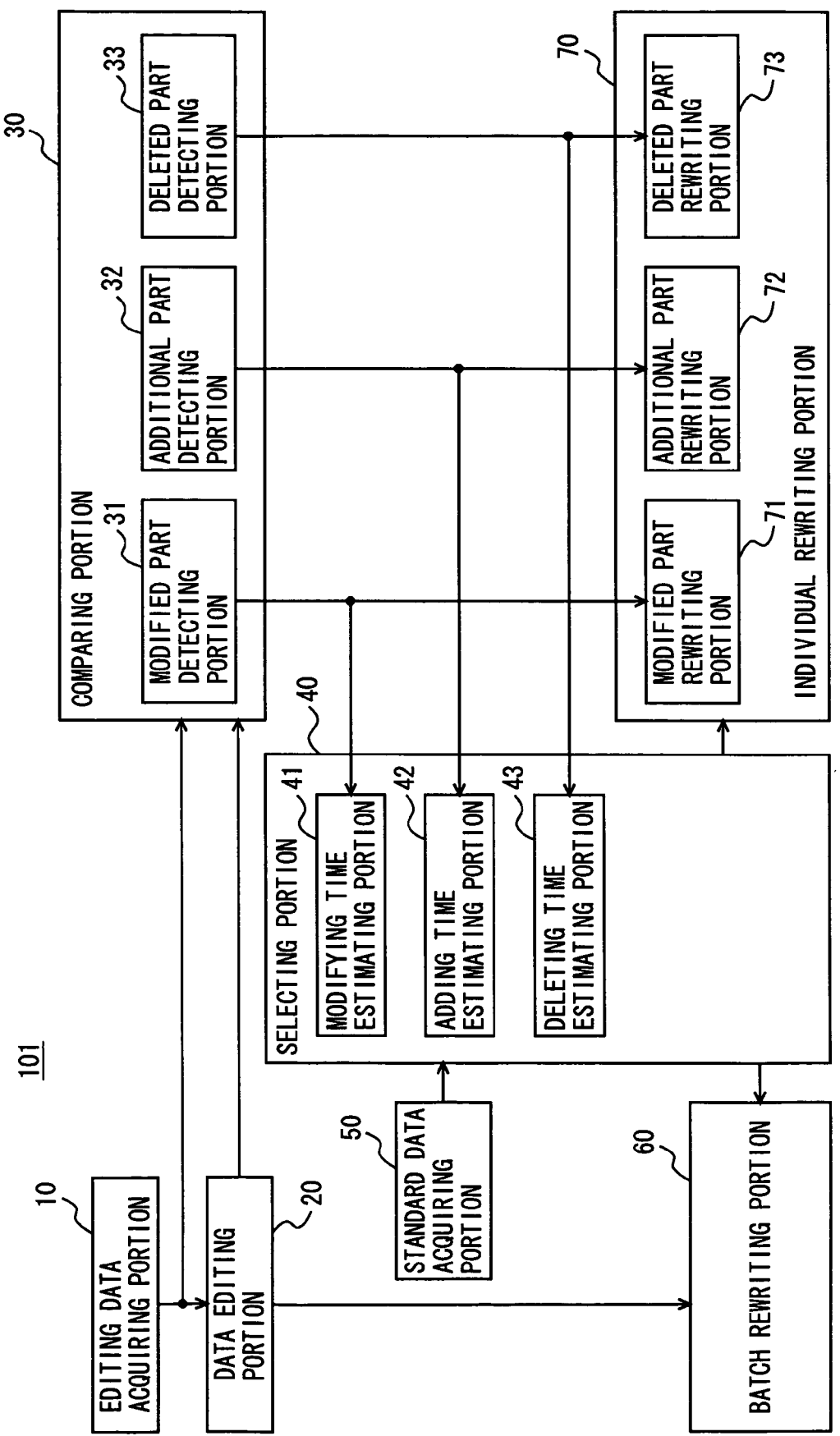
FIG. 4 is a functional block diagram illustrating an overall function of a CPU of the PC.

FIG. 4 is a functional block diagram illustrating an overall function of CPU 101 of PC 100, wherein the functions available when CPU 101 executes a driver program are shown. CPU 101 includes: an editing data acquiring portion 10 which acquires at least part of the destination data stored in HDD 216 as editing data from MFP 200; a data editing portion which edits the editing data; a comparing portion 30 which compares the pre-editing version of the editing data against the edited version thereof to detect the edited part which differs from the pre-editing version of the editing data; a selecting portion 40 which estimates time for MFP 200 to update all data of the edited part based on the number of records included in the edited part and standard data, and selects either a rewrite-all mode or an individual rewrite mode based on the estimated updating time; a standard data acquiring portion 50 which acquires standard data; in the rewrite-all mode, a batch rewriting portion 60 which rewrites the destination data stored in HDD 216 of MFP 200 with the edited version of the editing data; and in the individual rewrite mode, an individual rewriting portion 70 which rewrites the records of the edited part of the destination data stored in HDD 216 of MFP 20 one by one.

Editing data acquiring portion 10 requests MFP 200 to send all or part of the destination data stored in HDD 216. When MFP 200 receives the request, it reads all or part of the destination data from HDD 216 and returns it to PC 100. When editing data acquiring portion 10 receives from MFP 200 all or part of the destination data that has previously been requested for sending, editing data acquiring portion 10 outputs the received data to both comparing portion 30 and data editing portion 20 as editing data. Comparing portion 30 temporarily stores the editing data in RAM 105.

Data editing portion 20 displays the editing data supplied from editing data acquiring portion 10 on display portion 119B, so as to receive editing instructions entered by a user via input portion 119A. Editing instructions include a modify instruction to modify the editing data, an add instruction to add a new record(s) to the editing data, and a delete instruction to delete all or part of the records from the editing data. Data editing portion 20 edits the editing data in response to the received instruction, and supplies the edited version of the editing data to comparing portion 30 and batch rewriting portion 60.

Batch rewriting portion 60 is enabled in the rewrite-all mode to send the edited version of the editing data together with the rewrite-all command to MFP 200, so as to let it rewrite the editing data of the destination data, stored in HDD 216 of MFP 200, with the edited version of the editing data supplied from data editing portion 20. When the rewrite-all command is received, MFP 200 rewrites the editing data of the destination data stored in HDD 216, with the edited version of the editing data received with the rewrite-all command. Rewriting data by sending the rewrite-all command is herein effected by sending the data in accordance with FTP.

Comparing portion 30 compares the edited version of the editing data supplied from data editing portion 20 against the pre-editing version of the editing data stored in RAM 105, to detect the edited part which is different between the pre-editing version of the editing data and the edited version of the editing data, and supplies it to individual rewriting portion 70 and selecting portion 40. The edited part includes modified part, additional part and deleted part. Comparing portion 30 includes a modified part detecting portion 31, an additional part detecting portion 32, and a deleted part detecting portion 33. Modified part detecting portion 31 compares the edited version of the editing data with pre-editing version of the editing data to detect the modified part which is different between the pre-editing version of the editing data and the edited version of the editing data, and supplies the detected modified part to individual rewriting portion 70 and selecting portion 40. Additional part detecting portion 32 compares the edited version of the editing data with the pre-editing version of the editing data to detect the additional part which is different between the pre-editing version of the editing data and the edited version of the editing data, and supplies the detected additional part to individual rewriting portion 70 and selecting portion 40. Deleted part detecting portion 33 compares the edited version of the editing data with the pre-editing version of the editing data to detect the deleted part which is different between the pre-editing version of the editing data and the edited version of the editing data, and supplies the detected deleted part to individual rewriting portion 70 and selecting portion 40.

Individual rewriting portion 70 is enabled in the individual rewrite mode to send at least one individual rewrite command to MFP 200, so as to rewrite all records one by one included in the edited part of the data supplied from comparing portion 30. If the edited part includes more than one record, individual rewiring portion 70 sends a multiple number of individual rewrite commands, each corresponding to each record, to MFP 200. In this case, rewriting one record in response to the individual rewrite command is effected by sending the data in accordance with SOAP. When MFP 200 receives the individual rewrite command, it rewrites the corresponding data stored in HDD 216 in response to the received individual rewrite command.

Specifically, individual rewriting portion 70 includes a modified part rewriting portion 71, an additional part rewriting portion 72, and a deleted part rewriting portion 73. Modified part rewriting portion 71 is input the modified part from modified part detecting portion 31 and sends at least one individual modify command to MFP 200, so as to rewrite all records included in the modified part one by one. When MFP 200 receives the individual modify command, it modifies the corresponding record of the destination data stored in HDD 216 in response to the received individual modify command. Additional part rewriting portion 72 is input the additional part from added part detecting portion 32 and sends at least one individual add command to MFP 200, so as to rewrite all records included in the additional part one by one. When MFP 200 receives the individual add command, it adds and stores the record included in the individual add command in the destination data stored in HDD 216. Deleted part rewriting portion 73 is input the deleted part from deleted part detecting portion 33 and sends at least one individual delete command to MFP 200, so as to rewrite all records included in the deleted part one by one. When MFP 200 receives the individual delete command, it deletes the record identified by the individual delete command from the destination data stored in HDD 216.

Standard data acquiring portion 50 acquires standard data and supplies it to selecting portion 40. The standard data includes a unit time to rewrite, which indicates time for MFP 200 to rewrite one record of the destination data stored in HDD 216 in response to the individual rewrite command, and a batch rewriting time which indicates time for MFP 200 to rewrite the destination data stored in HDD 216 in response to the rewrite-all command. The unit time to rewrite includes a unit time to modify, a unit time to add, and a unit time to delete. PC 100 previously stores the unit time to rewrite and the batch rewriting time of MFP 200 in HDD 107, so that standard data acquiring portion 50 is able to read the unit time to rewrite and the batch rewriting time from HDD 107. If the machine type of MFPs 200 and 201 is different from each other, PC 100 stores the unit time to rewrite and the batch rewriting time in advance corresponding to MFPs 200 and 201, respectively, in HDD 107, allowing standard data acquiring portion 50 to read the unit time to rewrite and the batch rewriting time from HDD 107 corresponding to the MFP that sent the editing data.

FIG. 5 illustrates an example of standard data. The standard data shown in FIG. 5 includes a unit time to rewrite and a batch rewriting time for each machine type. MFPs 200 and 201 are herein indicated as "Type A MFP" and "Type B MFP", respectively, in order to illustrate the standard data of MFPs 200 and 201 when their machine type is different from each other. The standard data defines the unit time to rewrite (i.e., the unit time to modify, the unit time to add, and the unit time to delete) and the batch rewriting time, corresponding to MFPs 200 and 201, respectively.

Instead of storing the standard data in HDD 107 of PC 100, MFP 200 may store the standard data in its HDD 216. In this case, standard data acquiring portion 50 acquires the standard data of MFP 200 by sending a request to send the standard data to MFP 200, and receives the standard data from MFP 200.

In addition, if the unit time to rewrite and the batch rewriting time of MFP 200 are different depending on the operation mode, the standard data for each operation mode may be stored in either HDD 107 or HDD 216 of MFP 200. In this case, the standard data acquiring portion 50 sends an inquiry to MFP 200 about the current operation mode thereof and will be notified of the operation mode from MFP 200. Then, standard data acquiring portion 50 reads the unit time to rewrite and the batch rewriting time corresponding to the notified operation mode from HDD 107, and supplies them to selecting portion 40. When MFP 200 stores the standard data in HDD 216, standard data acquiring portion 50 requests MFP 200 to send the standard data, and MFP 200 reads the standard data stored in HDD 216 corresponding to the current operation mode and returns the acquired data to PC 100. Standard data acquiring portion 50 supplies the unit time to rewrite and the batch rewriting time included in the received standard data to selecting portion 40.

FIG. 6 illustrates another example of standard data for each operation mode of MFP 200. The standard data as shown in FIG. 6 will be provided when MFP 200 has three types of operation mode including a stand-by mode which is an operation mode capable of directly starting the image forming operation, a printing mode in which the image forming operation is underway, and a sleep mode which is an operation mode requiring less power consumption. The standard data defines the unit time to rewrite and the batch rewriting time for each operation mode, i.e., for the stand-by mode, printing mode, and sleep mode, respectively Alternatively, the standard data may not be stored in PC 100, nor in MFP 200. Instead, the standard data may be generated by sending the individual rewrite command and the rewrite-all command directly to MFP 200, and measuring time to rewrite the data stored in HDD 216 of MFP 200 using test data.

Referring back to FIG. 4, selecting portion 40 calculates the individual rewriting time to rewrite the data stored in HDD 216 of MFP 200 individually with the edited part of the data supplied from comparing portion 30. Specifically, selecting portion 40 calculates the individual rewriting time by multiplying the number of records included in the edited part supplied from comparing portion 30 by the unit time to rewrite for MFP 200 to rewrite one record in response to the individual rewrite command. Then, selecting portion 40 compares the individual rewriting time with the batch rewriting time, and selects either the rewire-all mode or the individual rewrite mode in accordance with the comparison result. Selecting portion 40 selects the individual rewrite mode if the individual rewriting time is shorter than the batch rewriting time, and vice versa. The individual rewriting time is a sum of the time for modifying, adding, and deleting the data. Selecting portion 40 enables the batch rewriting portion 60 if the batch rewriting mode is selected, while the individual rewrite mode is enabled if the individual rewrite mode is selected.

Specifically, selecting portion 40 includes a modifying time estimating portion 41, an adding time estimating portion 42, and a deleting time estimating portion 43. Modifying time estimating portion 41 estimates the modifying time by multiplying the number of records included in the modified part supplied from modified part detecting portion 31 by the unit time to modify for MFP 200 to modify one record in response to the individual modify command. Adding time estimating portion 42 estimates the adding time by multiplying the number of records included in the added part supplied from added part detecting portion 32 by the unit time to add for MFP 200 to add one record in response to the individual add. Deleting time estimating portion 43 estimates the deleting time by multiplying the number of records included in the deleted part supplied from deleted part detecting portion 33 by the unit time to delete for MFP 200 to delete one record in response to the individual delete command.

Figure 7:
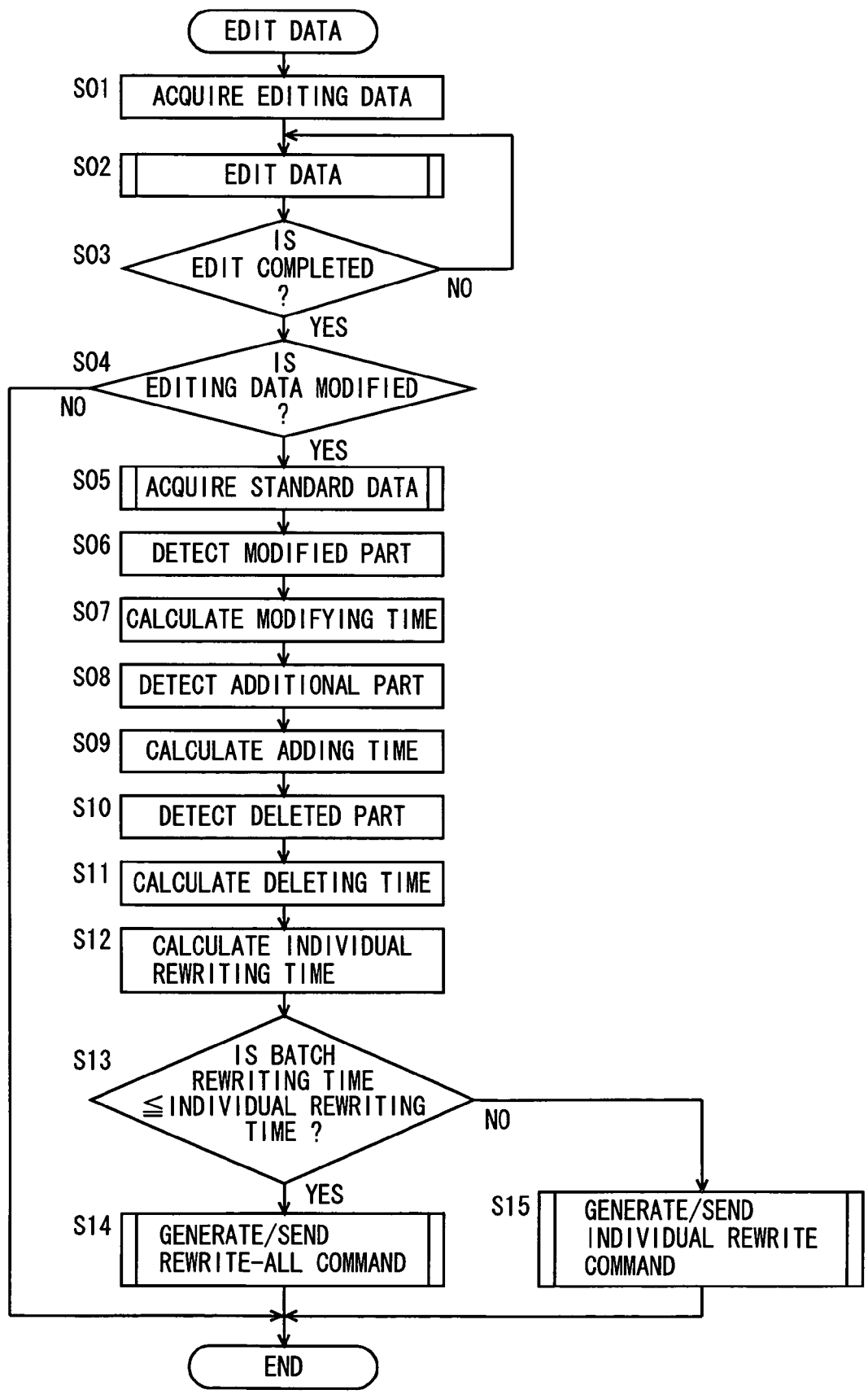
FIG. 7 illustrates an exemplary data editing procedure.

Referring to FIG. 7, there is shown a flow chart illustrating an exemplary data editing procedure. The data editing procedure is a process executed by CPU 101 of PC 100 by running a data managing program, which is provided as part of the driver program, in CPU 101. As shown in FIG. 7, CPU 101 previously acquires editing data in response to an instruction from the user (step S01). Specifically, CPU 101 requests MFP 200 to send all or part of the destination data designated by the user via input portion 119A. When all or part of the destination data sent from MFP 200 is received at communication I/F 111, the data received at communication I/F 111 is acquired as editing data. Then, the editing procedure begins (step S02). The editing procedure involves displaying the editing data on display portion 119B, receiving the editing instruction entered by the user via input portion 119A, and generating the edited version of the editing data. In the next step S03, it is determined whether or not the editing is completed. If the editing has been completed, the process proceeds to step S04, otherwise the process returns to step S02 to continue editing. When the user enters the instruction to finish editing into input portion 119A, the finish instruction to terminate the editing is received.

In step S04, it is determined whether or not the editing data has been changed by comparing the pre-editing version against the edited version of the editing data. If the editing data has been changed, the process proceeds to step S05. On the other hand, the process ends if the editing data has not been changed, in that the editing procedure is supposed to rewrite the pre-editing data with the post-editing data when the data stored in HDD 216 of MFP 200 is changed.

In step S05, the standard data is acquired and the process proceeds to step S06. The step of acquiring the standard data, as will be described later, is to acquire the unit time to modify, add, and delete the data, as well as time to rewrite all data. In step S06, the pre-editing version of the editing data is compared against the edited version thereof, so as to detect, in the edited version of the editing data, the modified part that differs from the pre-editing version of the editing data. Next, in step S07, according to an equation (1) below, a modifying time to rewrite all records of included in the modified part is calculated based on the number of records included in the modified part and the unit time to modify. In step S08, the pre-editing version of the editing data is compared against the edited version thereof, so as to detect, in the edited version of the editing data, the additional part added to the pre-editing version of the editing data. In the next step S09, an additional time to rewrite all records included in the additional part is calculated based on the number of records included in the additional part and the unit time to add, according to an equation (2) below. In step S10, the pre-editing version of the editing data is compared against the edited version thereof, so as to detect the deleted part removed from the pre-editing version of the editing data. In the next step S11, a deleting time to rewrite all records included in the deleted part is calculated, according to an equation (3) below. In the next step S12, an individual rewriting time is calculated, according to an equation (4) below, by adding the modifying time, the additional time, and the deleted time.

$$\text{Modifying Time} = \text{Number of Records of Modified Part} \times \text{Unit Time to Modify} \quad (1)$$

$$\text{Adding Time} = \text{Number of Records of Additional Part} \times \text{Unit Time to Add} \quad (2)$$

$$\text{Deleting Time} = \text{Number of Records of Deleted Part} \times \text{Unit Time to Delete} \quad (3)$$

$$\text{Individual Rewriting Time} = \text{Modifying Time} + \text{Adding Time} + \text{Deleting Time} \quad (4)$$

Then, the batch rewriting time is compared with the individual rewriting time (step S13) and, if the batch rewriting time is equal to or less than the individual rewriting time, the process proceeds to step S14. If the batch rewriting time is longer than the individual rewriting time, the process proceeds to step S15. In step S14, the operation mode is switched to the rewrite-all mode, and the step of generating the rewrite-all command and sending it to MFP 200 will be executed. On the other hand, in step S15, the operation mode is switched to the individual rewrite mode, and the step of generating the individual rewrite commands and sending them to MFP 200 will be executed. The individual rewrite commands include the individual modify command(s), the individual add command(s), and the individual delete command(s), so that CPU 101 generates these commands equaling the number of records included in the modified part, the additional part, and the deleted part, respectively, and send them to MFP 200 individually in step S15. The step of generating/sending the individual rewrite commands will be described more in detail later.

Figure 8:
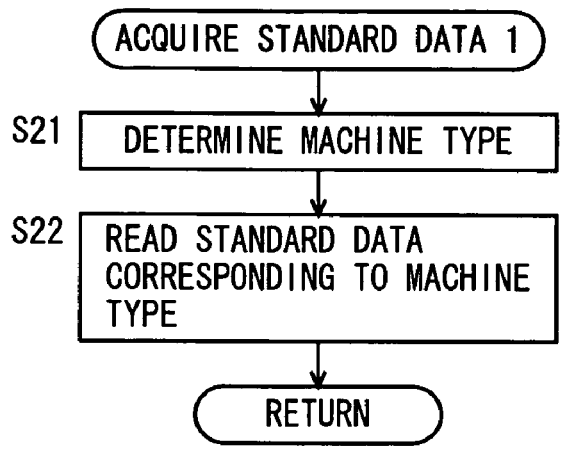
FIG. 8 is a first flow chart illustrating an exemplary standard data acquiring procedure.

FIG. 8 is a first flow chart illustrating an exemplary standard data acquiring procedure which is executed in step S05 of FIG. 7 when the standard data as shown in FIG. 5 is previously stored in HDD 107. As shown in FIG. 8, CPU 101 determines the machine type of MFP 200 that sent the editing data (step S21), and reads the standard data that is previously stored in HDD 107 corresponding to the determined machine type (step S22). As MFP 200 is a "type A MFP" here, the standard data defined corresponding to the "type A MFP" will be read from the standard data shown in FIG. 5. Thus, it is possible to switch the operation mode accurately between the rewrite-all mode and the individual rewrite mode, even if the individual rewriting time and the batch rewriting time are different depending on the machine type of the MFP.

Figure 9:
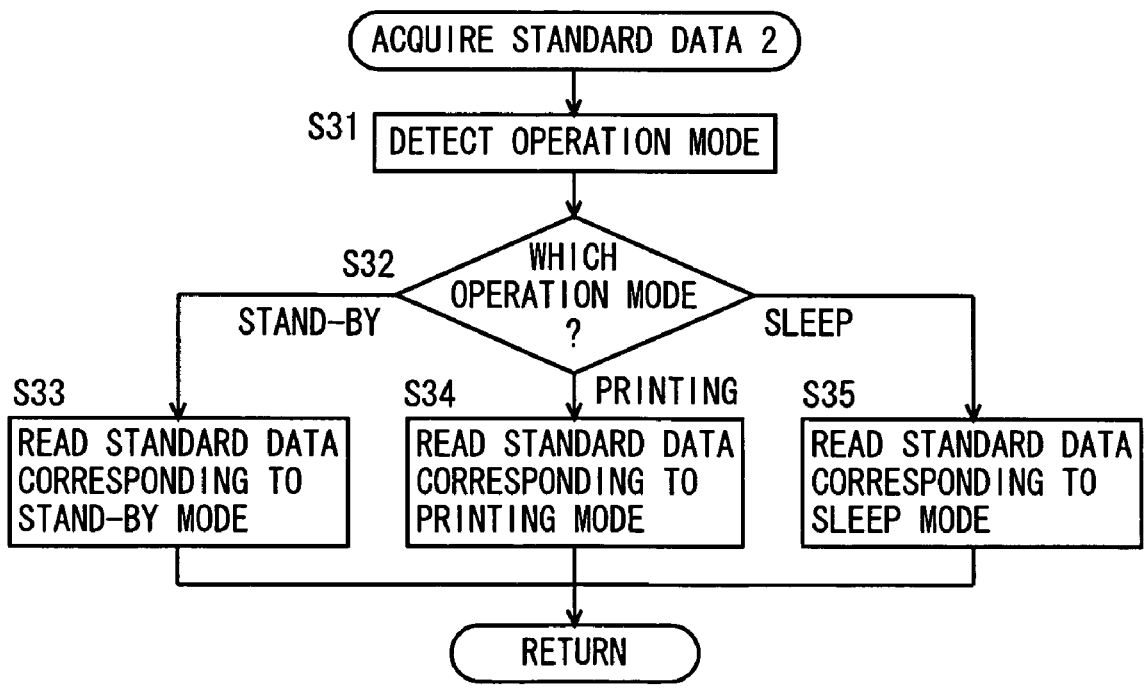
FIG. 9 is a second flow chart illustrating an exemplary standard data acquiring procedure.

FIG. 9 is a second flow chart illustrating an exemplary standard data acquiring procedure which is executed in step S05 of FIG. 7, when the standard data shown in FIG. 6 is previously stored in HDD 107. As shown in FIG. 9, CPU 101 detects the operation mode of MFP 200 (step S31), and the process branches out depending on the operation mode (step S32). If MFP 200 is in the stand-by mode, the process proceeds to step S33; if MFP 200 is during printing, the process proceeds to step S34; and if MFP 200 is in the sleep mode, the process proceeds to step S35. In step S33, part of the standard data corresponding to the stand-by mode is read from the standard data previously stored in HDD 107. In step S34, another part of the standard data corresponding to the printing mode is read from the standard data previously stored in HDD 107. In step S35, still another part of the standard data corresponding to the sleep mode is read from the standard data previously stored in HDD 107. Again, it is possible to accurately switch the operation mode between the rewrite-all mode and the individual rewrite mode, even if the individual rewriting time and the batch rewriting time are different depending on the operation mode of MFP 200.

Figure 10:
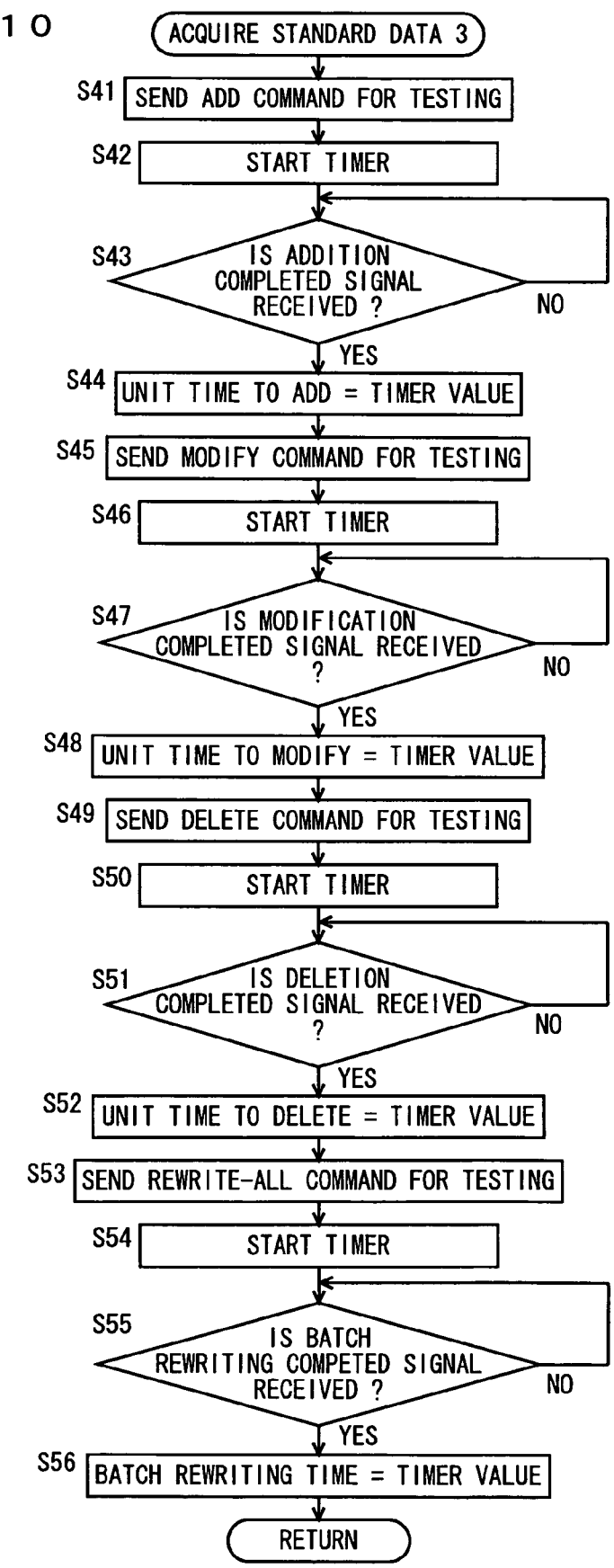
FIG. 10 is a third flow chart illustrating an exemplary standard data acquiring procedure.

FIG. 10 is a third flow chart illustrating an exemplary standard data acquiring procedure which is executed in step S05 of FIG. 7 when the standard data is not previously stored in HDD 107. As shown in FIG. 10, CPU 101 sends an individual add command for testing to MFP 200 (step S41). One record of test data is sent to MFP 200 together with the individual add command for testing. Then, the timer is started (step S42). When the individual add command is received, MFP 200 adds the one record of test data to the destination data stored in HDD 216. Upon completion of adding the test data to the destination data, MFP 200 returns a signal indicating completion of the addition to PC 100. On the other hand, PC 100 has entered the stand-by mode until the addition completed signal is received (NO at step S43), and when the signal is received (YES at step S43), the process proceeds to step S44. In step S44, the unit time to add is set to a value of the timer.

In the next step S45, CPU 101 sends an individual modify command for testing to MFP 200. The individual modify command is to modify the test data that has been added in the previous steps. Then, the timer is started (step S46). When the individual modify command is received, MFP 200 modifies the test data that has been stored in HDD 216 previously. Upon completion of modifying the test data, MFP 200 returns a signal indicating completion of the modification to PC 100. On the other hand, PC 100 has entered the stand-by mode until it receives the modification completed signal (NO at step S47), and when the signal is received (YES at step S47), the process proceeds to step S48. In step S48, the unit time to modify is set to a value of the timer.

In the next step S49, CPU 101 sends an individual delete command for testing to MFP 200. The individual delete command is to delete the test data that has been modified in the previous steps. Then, the timer is started (step S50). When the individual delete command is received, MFP 200 deletes the test data stored in HDD 216. Upon completion of deleting the test data, MFP 200 returns a signal indicating completion of the deletion to PC 100. On the other hand, PC 100 has entered the stand-by mode until it receives the deletion completed signal (NO at step S51), and when the signal is received (YES at step S51), the process proceeds to step S52. In step S52, the unit time to delete is set to a value of the timer.

In the next step S53, CPU 100 sends the rewrite-all command for testing to MFP 200. The rewrite-all command is to store new test data other than the destination data in HDD 107 of MFP 200. The test data is sent to MFP 200 together with the rewrite-all command for testing. The test data may include at least one record of data. Then, the timer is started (step S54). When the rewrite-all command is received, MFP 200 stores the test data received with the rewrite-all command in HDD 216. Upon completion of batch rewriting of the test data, MFP 200 returns a signal indicating completion of the batch rewriting to PC 100. On the other hand, PC 100 has entered the stand-by mode until the batch rewriting completed signal is received (NO at step S55), and when the signal is received (YES at step S55), the process proceeds to step S56. In step S56, the batch rewriting time is set to a value of the timer.

Figure 11:
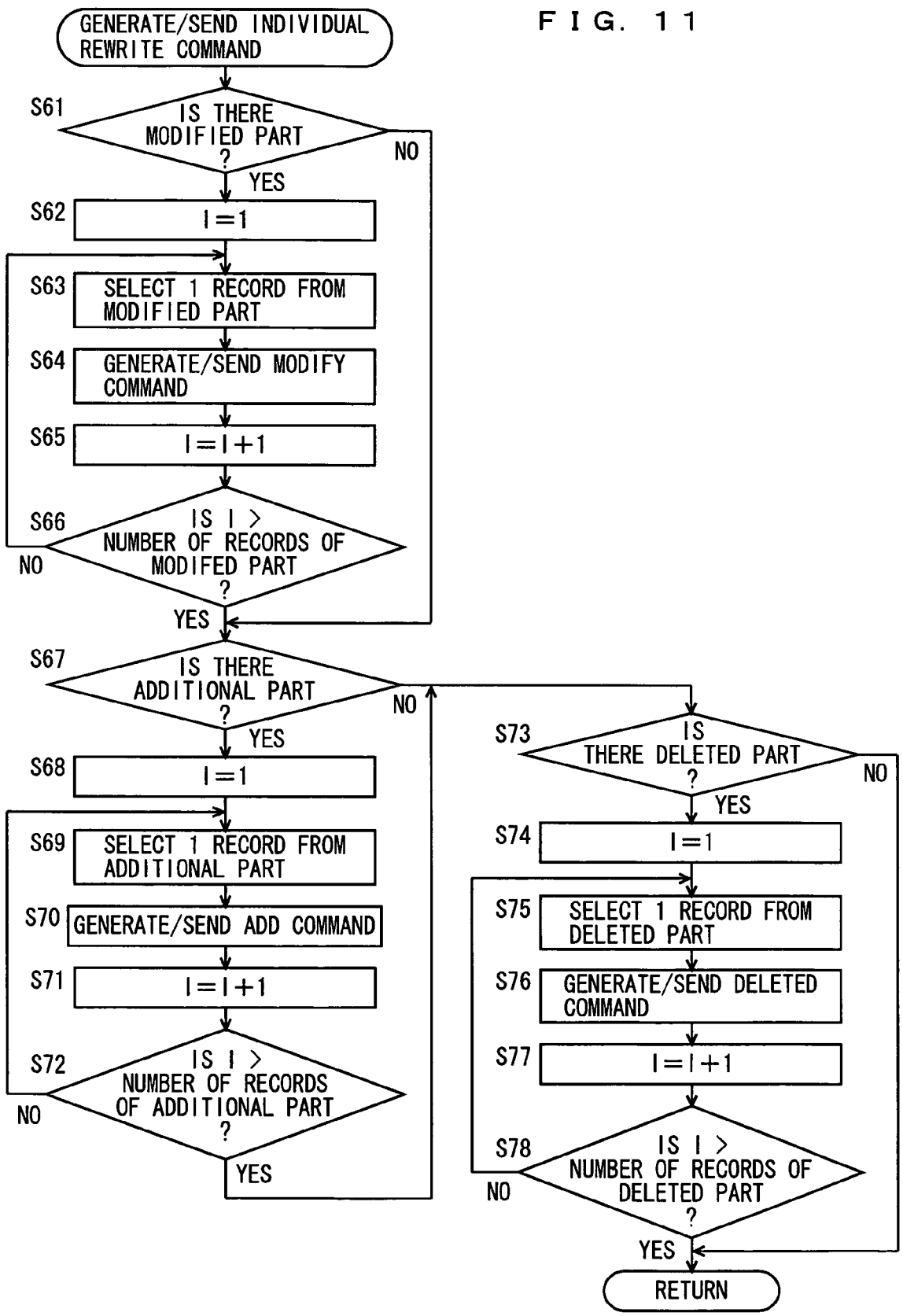
FIG. 11 is a flow chart illustrating an exemplary procedure of generating/sending an individual rewrite command.

FIG. 11 is a flow chart illustrating an exemplary individual rewrite command generating/sending procedure which is executed in step S15 of FIG. 7. As shown in FIG. 11, it is determined whether or not the modified part is detected (step S61). If the modified part has been detected in step S06 of FIG. 7, the process proceeds to step S62, otherwise the process proceeds to step S67. In step S62, a variable I is set to the initial value "1" and the process proceeds to step S63. The variable I is a counter to count the number of generated individual modify commands. In step S63, one record is selected from the records of the modified part. Then, the individual modify command to rewrite the data with the selected record is generated and sent to MFP 200 (step S64). Namely, one individual modify command corresponding to the one record of the modified part is sent to MFP 200. In the next step S65, the variable I is incremented and the process proceeds to step S66. In step S66, the variable I is compared against the number of records of the modified part and, if the variable I is greater than the number of records, the process proceeds to step S67, otherwise the process returns to step S63. Specifically, CPU 101 sends a particular number of individual modify commands equal to the number of records of the modified part to MFP 200, and proceeds the process to step S67.

In step S67, it is determined whether or not the additional part is detected. If the additional part has been detected in step S08 of FIG. 7, the process proceeds to step S68, otherwise the process proceeds to step S73. In step S68, a variable I is set to the initial value "1" and the process proceeds to step S69. The variable I is a counter to count the number of generated individual add commands. In step S69, one record is selected from the records of the additional part. Then, the individual add command to rewrite the selected record is generated and sent to MFP 200 (step S70). Namely, one individual add command corresponding to the one record of the additional part is sent to MFP 200. In the next step S71, the variable I is incremented and the process proceeds to step S72. In step S72, the variable I is compared against the number of records of the additional part and, if the variable I is greater than the number of records, the process proceeds to step S73, otherwise the process returns to step S69. Specifically, CPU 101 sends a particular number of individual add commands equal to the number of records of the additional part to MFP 200, and proceeds the process to step S73.

In step S73, it is determined whether or not the deleted part is detected. If the deleted part has been detected in step S10 of FIG. 7, the process proceeds to step S74, otherwise the process ends. In step S74, a variable I is set to the initial value "1" and the process proceeds to step S75. The variable I is a counter to count the number of generated individual delete commands. In step S75, one record is selected from the records of the deleted part. In response, the individual delete command to rewrite the selected record is generated and sent to MFP 200 (step S76). Thus, one individual add command corresponding to the one record of the deleted part is sent to MFP 200. In the next step S77, the variable I is incremented and the process proceeds to step S78. In step S78, the variable I is compared against the number of records of the deleted part and, if the variable I is greater than the number of records, the process ends, otherwise the process returns to step S75. Specifically, CPU 101 sends a particular number of individual delete commands equal to the number of records of the deleted part to MFP 200, and completes the process.

As described above, MFP 200 rewrites the editing data in response to the rewrite-all command, and the time to perform the rewriting job substantially remains the same regardless of whether the data amount of the editing data is changed. MFP 200 also rewrites the editing data in response to the individual rewrite command(s), where the edited part of the editing data that differs from the pre-editing version of the editing data is rewritten for each record, so that more time may be needed to rewrite as more records are included in the edited part. By selecting, however, either the rewrite-all mode or the individual rewrite mode depending on the number of records included in the edited part of the data, it is possible to allow MFP 200 to rewrite the destination data stored in HDD 216 in a short time.

Selecting portion 40 includes modifying time estimating portion 41, adding time estimating portion 42, and deleting time estimating portion 43, in order to estimate the individual rewriting time for MFP 200 to complete rewriting all records included in the edited part of the data, based on the number of records included in the edited part and the unit time to rewrite one record in response to the individual rewrite command. Selecting portion 40 compares the estimated individual rewriting time against the batch rewriting time for MFP 200 to rewrite the data with the edited version of the editing data in response to the rewrite-all command. Thus, it is possible to accurately estimate the individual rewrite time corresponding to the number of records included in the edited part of the data.

Selecting portion 40 also receives the unit time to rewrite and the batch rewriting time from MFP 200, which further allows the accurate estimation of the individual rewriting time and the batch rewriting time even when the machine type of MFP 200 is changed, and allows MFP 200 to rewrite the destination data stored in HDD 216 in a short time.

Further, the operation mode of MFP 200 is detected, and the unit time to rewrite and the batch rewriting time corresponding to the detected operation mode are acquired, which again allows the accurate estimation of the individual rewriting time and the batch rewriting time, even if the data rewriting time of MFP 200 is changed depending on the operation mode, and which further allows correct switching of the operation mode between the batch rewriting mode and the individual rewriting mode.

Further, the individual rewrite command is sent to MFP 200 to measure the individual rewriting time for MFP 200 to rewrite the test data, while the rewrite-all command is also sent to MFP 200 to measure the batch rewriting time for MFP 200 to rewrite the test data, which allows the accurate estimation of the individual rewriting time and the batch rewriting time, even if the standard data is not stored in PC, nor MFP 200, and also allows MFP 200 to rewrite the destination data stored in HDD 216 in a short time.

Again, selecting portion 40 includes the modifying time estimating portion 41 that estimates the modifying time based on the number of records of the modified part and the unit time to modify; the adding time estimating portion 42 that estimates the adding time based on the number of records of the additional part and the unit time to add; and the deleting time estimating portion 43 that estimates the deleting time based on the number of records of the deleted part and the unit time to delete. Thus, the accurate estimation of the individual rewriting time can be calculated even if MFP 200 has different processing time to modify, add, or delete the records.

It should be noted that although the printing system 1 has been described in the above embodiment, it is apparent that the present invention can be implemented as a method or a program to manage data to cause PC 100 to execute the procedures as illustrated in FIGS. 7-11.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data managing device comprising:
    a data acquiring portion to acquire from an image processing apparatus at least part of data stored therein as editing data;
    an editing portion to edit said acquired editing data;
    a detecting portion to detect an edited part which is different between a pre-editing version of said editing data and an edited version of said editing data;
    a selecting portion to select either a rewrite-all mode or an individual rewrite mode based on the number of records included in said detected edited part;
    in said rewrite-all mode, a batch rewriting portion to send a rewrite-all command to said image processing apparatus, so as to instruct said image processing apparatus to rewrite said pre-editing version of the editing data with said edited version of the editing data; and
    in said individual rewriting mode, an individual rewriting portion to send at least an individual rewrite command to said image processing apparatus, so as to instruct said image processing apparatus to rewrite all records included in said edited part one by one.

2. A data managing device according to claim 1, wherein said selecting portion includes
    an estimating portion to estimate an individual rewriting time for said image processing apparatus to rewrite all records included in said edited part, based on the number of records included in said detected edited part and a unit time to rewrite for said image processing apparatus to rewrite one record in response to said individual rewrite command, and
a comparing portion to compare said estimated individual rewriting time with a batch rewriting time for said image processing apparatus to rewrite said pre-editing version of the editing data with said edited version of the editing data in response to said rewrite-all command.

3. A data managing device according to claim 2, further comprising a standard data acquiring portion to receive said unit time to rewrite and said batch rewriting time from said image processing apparatus.

4. A data managing device according to claim 2, further comprising:
an operation mode detecting portion to detect an operation mode of said image processing apparatus; and
a standard data acquiring portion to receive said unit time to rewrite and said batch rewriting time corresponding to said detected operation mode.

5. A data managing device according to claim 2, further comprising:
a first measuring portion to measure said unit time to rewrite by sending said individual rewrite command to said image processing apparatus and measuring time for said image processing apparatus to rewrite test data; and
a second measuring portion to measure said batch rewriting time by sending said rewrite-all command to said image processing apparatus and measuring time for said image processing apparatus to rewrite test data.

6. A data managing device according to claim 1, wherein said detecting portion includes
a modified part detecting portion to detect modified part modified from said pre-editing version of the editing data in said edited version of the editing data,
an additional part detecting portion to detect additional part added to said pre-editing version of the editing data in said edited version of the editing data, and
a deleted part detecting portion to detect deleted part deleted from said pre-editing version of the editing data in said edited version of the editing data, and wherein
said individual rewriting portion includes
an individual modify command sending portion to send at least an individual modify command to order rewriting all records included in said modified part one by one, when said modified part is detected,
an individual add command sending portion to send at least an individual add command to order rewriting all records included in said additional part one by one, when said additional part is detected, and
an individual delete command sending portion to send at least an individual delete command to order rewriting all records included in said deleted part one by one, when said deleted part is detected.

7. A data managing device according to claim 6, wherein said selecting portion includes
a modifying time estimating portion to estimate modifying time based on the number of records included in said modified part and a unit time to modify for said image processing apparatus to modify one record in response to said individual modify command,
an adding time estimating portion to estimate adding time based on the number of records included in said additional part and a unit time to add for said image processing apparatus to add one record of data in response to said individual add command, and
a deleting time estimating portion to estimate deleting time based on the number of records included in the deleted part and a unit time to delete for said image processing apparatus to delete one record of data in response to said individual delete command.

8. A data managing device according to claim 7, further comprising a standard data acquiring portion to receive said unit time to modify, said unit time to add, and said unit time to delete from said image processing apparatus.

9. A data managing device according to claim 7, further comprising
an operation mode detecting portion to detect an operation mode of said image processing apparatus, and
a standard data acquiring portion to acquire said unit time to modify, said unit time to add, said unit time to delete, and batch rewriting time, corresponding to said detected operation mode.

10. A data managing device according to claim 7, further comprising
a unit time to modify measuring portion to measure said unit time to modify by sending said individual modify command to said image processing apparatus and measuring time for said image processing apparatus to modify test data,
a unit time to add measuring portion to measure said unit time to add by sending said individual add command to said image processing apparatus and measuring time for said image processing apparatus to add test data,
a unit time to delete measuring portion to measure said unit time to delete by sending said individual delete command to said image processing apparatus and measuring time for said image processing apparatus to delete test data, and
a batch rewriting time measuring portion to measure said batch rewriting time by sending said rewrite-all command to said image processing apparatus and measuring time for said image processing apparatus to rewrite test data.

11. A data managing program embodied on a non-transitory computer readable medium for causing a computer to execute processing comprising the steps of:
acquiring from an image processing apparatus at least part of data stored therein as editing data;
editing said acquired editing data;
detecting an edited part which is different between a pre-editing version of said editing data and an edited version of said editing data;
selecting either a rewrite-all mode or an individual rewrite mode based on the number of records included in said detected edited part;
when said rewrite-all mode is selected, sending a rewrite-all command to said image processing apparatus, so as to instruct said image processing apparatus to rewrite said pre-editing version of the editing data with said edited version of the editing data; and
when said individual rewriting mode is selected, sending at least an individual rewrite command to said image processing apparatus, so as to instruct said image processing apparatus to rewrite all records included in said edited part one by one.

12. A data managing program embodied on a non-transitory computer readable medium according to claim 11, wherein
said selecting step includes
estimating an individual rewriting time for said image processing apparatus to rewrite all records included in said edited part, based on the number of records included in said detected edited part and a unit time to rewrite for said image processing apparatus to rewrite one record in response to said individual rewrite command, and comparing said estimated individual rewriting time with a batch rewriting time for said image processing apparatus to rewrite said pre-editing version of the editing data with said edited version of the editing data in response to said rewrite-all command.

13. A data managing program embodied on a non-transitory computer readable medium according to claim 12, wherein said processing further comprises the step of receiving said unit time to rewrite and said batch rewriting time from said image processing apparatus.

14. A data managing program embodied on a non-transitory computer readable medium according to claim 12, wherein said processing further comprises the steps of
    detecting an operation mode of said image processing apparatus, and
    acquiring said unit time to rewrite and said batch rewriting time corresponding to said detected operation mode.

15. A data managing program embodied on a non-transitory computer readable medium according to claim 12, wherein said processing further comprises the steps of
    measuring said unit time to rewrite by sending said individual rewrite command to said image processing apparatus and measuring time for said image processing apparatus to rewrite test data, and
    measuring said batch rewriting time by sending said rewrite-all command to said image processing apparatus and measuring time for said image processing apparatus to rewrite test data.

16. A data managing program embodied on a non-transitory computer readable medium according to claim 11, wherein
    the step of detecting said edited part includes steps of
    detecting a modified part modified from said pre-editing version of the editing data in said edited version of the editing data,
    detecting an additional part added to said pre-editing version of the editing data in said edited version of the editing data, and
    detecting a deleted part deleted from said pre-editing version of the editing data in said edited version of the editing data, and wherein
    the step of sending said individual rewrite command includes steps of
    sending at least an individual modify command to order rewriting all records included in said modified part one by one, when said modified part is detected,
    sending at least an individual add command to order rewriting all records included in additional part one by one, when said additional part is detected, and
    sending at least an individual delete command to order rewriting all records included in deleted part one by one, when said deleted part is detected.

17. A data managing program embodied on a non-transitory computer readable medium according to claim 16, wherein
    the step of selecting includes steps of
    estimating modifying time based on the number of records included in said modified part and a unit time to modify for said image processing apparatus to modify one record of data in response to said individual modify command,
    estimating adding time based on the number of records included in said additional part and a unit time to add for said image processing apparatus to add one record of data in response to said individual add command, and
    estimating deleting time based on the number of records included in the deleted part and a unit time to delete for said image processing apparatus to delete one record of data in response to said individual delete command.

18. A data managing program embodied on a non-transitory computer readable medium according to claim 17, further comprising the step of receiving said unit time to modify, said unit time to add, and said unit time to delete from said image processing apparatus.

19. A data managing program embodied on a non-transitory computer readable medium according to claim 17, wherein said processing further comprises the steps of
    detecting an operation mode of said image processing apparatus, and
    acquiring said unit time to modify, said unit time to add, said unit time to delete, and batch rewriting time, corresponding to said detected operation mode.

20. A data managing program embodied on a non-transitory computer readable medium according to claim 17, wherein said processing further comprises the steps of
    measuring said unit time to modify by sending said individual modify command to said image processing apparatus, and measuring time for said image processing apparatus to modify test data,
    measuring said unit time to add by sending said individual add command to said image processing apparatus, and measuring time for said image processing apparatus to add test data,
    measuring said unit time to delete by sending said individual delete command to said image processing apparatus, and measuring time for said image processing apparatus to delete test data, and
    measuring said batch rewriting time by sending said rewrite-all command to said image processing apparatus, and measuring time for said image processing apparatus to rewrite test data.

21. A data managing method executed by a computer connected to an image processing apparatus via a network, to manage data stored in said image processing apparatus, comprising the steps of:
    acquiring from said image processing apparatus at least part of said data stored therein as editing data;
    editing said acquired editing data;
    detecting an edited part which is different between a pre-editing version of said editing data and an edited version of said editing data;
    selecting either a rewrite-all mode or an individual rewrite mode based on the number of records included in said detected edited part;
    when said rewrite-all mode is selected, sending a rewrite-all command to said image processing apparatus, so as to instruct said image processing apparatus to rewrite said pre-editing version of the editing data with said edited version of the editing data; and
    when said individual rewriting mode is selected, sending at least an individual rewrite command to said image processing apparatus, so as to instruct said image processing apparatus to rewrite all records included in said edited part one by one.

* * * * *